INVENTOR
J. I. ACKERMAN JR

April 30, 1957  J. I. ACKERMAN, JR  2,790,389
VENT SEAL

Filed Sept. 9, 1955  3 Sheets-Sheet 3

INVENTOR
J. I. ACKERMAN JR

BY
ATTORNEYS

United States Patent Office 2,790,389
Patented Apr. 30, 1957

2,790,389

VENT SEAL

Joseph I. Ackerman, Jr., Elkton, Md., assignor, by mesne assignments, to the United States of America as represented by the Secretary of the Navy Application September 9, 1955, Serial No. 533,530

8 Claims. (Cl. 102—37.8)

The present invention relates to a vent seal and more particularly to a new and improved waterproof hermetic seal for use in smoke and flare munitions, incendiary devices and underwater signaling devices. More especially the invention contemplates the provision of a vent seal for venting gas pressure and/or flame while allowing only a safe minimum pressure to build up within the device in which the seal is employed.

It is well known to those skilled in the art, the cost of munition of the types previously referred to, decreases greatly as the maximum internal pressure requirement of the system decreases. The maximum internal pressure requirement can be greatly reduced if the seal is consistently and reliably operable and easy venting. Furthermore, it is well recognized that often only a moderate increase in the pressure required to blow out a vent seal may result in substantial destruction or otherwise render ineffective the performance of the device at the time of seal breaking. It has been found that in operation there is rapid build-up of pressure within devices of the aforesaid types and this increase in pressure may quickly cause disruption of the device unless quick venting is obtained. Moreover, at present, the type of seals used with such devices have not proven entirely satisfactory for the following reasons: Blow-out at too high a pressure causing non-functioning or misfunctioning of the signal or device, mechanically weak vent seals which may be broken or fall apart before use, allowing moisture to enter the device and causing the pyrotechnic compositions and/or explosives to become substantially deteriorated over a short period of time, inadequate protection against moisture entry even if the seal is unbroken, insufficient strength against external mechanical, water or gas pressure, not sufficiently resistant to vibration and rough handling, and not sufficiently permanent against wide temperature changes. Moreover, such prior art devices require the use of a separate cover over the vent seal removable by hand before the device could be operated. Such covers usually consisted of screw caps, soldered seals and the like and thus under emergency or distress circumstances devices of this type could not be put into service with the required speed.

The device of the present invention contemplates the provision of a new and improved vent seal which overcomes all the disadvantages heretofore encountered in prior art devices of this character by providing a seal which will resist mechanical shocks and vibrations, jolts and the like, possesses a resistance to wide temperature variations such, for example as —65° F. to 160° F., and which is admirably suited for use in pyrotechnic signal devices and incendiary munitions.

An object of the present invention is to provide a new and improved vent seal for use in a pyrotechnic device having high resistance to mechanical shocks and vibrations.

Another object of the invention is the provision of a new and improved vent seal having high external strength and which will readily unseal in response to internal pressure.

Another object of the invention is the provision of a vent seal for a pyrotechnic device having the desired characteristics of being consumed in a short period of time by heat and flame thereby to vent the device quickly to prevent disruption thereof by the accumulation of gas pressure generated therein as the pyrotechnic material is ignited and burns.

Still another object of the invention is the provision of a vent seal for a pyrotechnic device which functions readily at low temperatures and which prevents deterioration of the pyrotechnic material contained therein while the device is stored over a long period of time.

A still further object of the invention is the provision of a vent seal which is economical in manufacture, reliable in operation, and which possesses all the desirable characteristics of ruggedness in service.

Other objects and many of the attendant advantages of this invention will be readily appreciated as the same becomes better understood by reference to the following detailed description when considered in connection with the accompanying drawings wherein.

Figure 1:
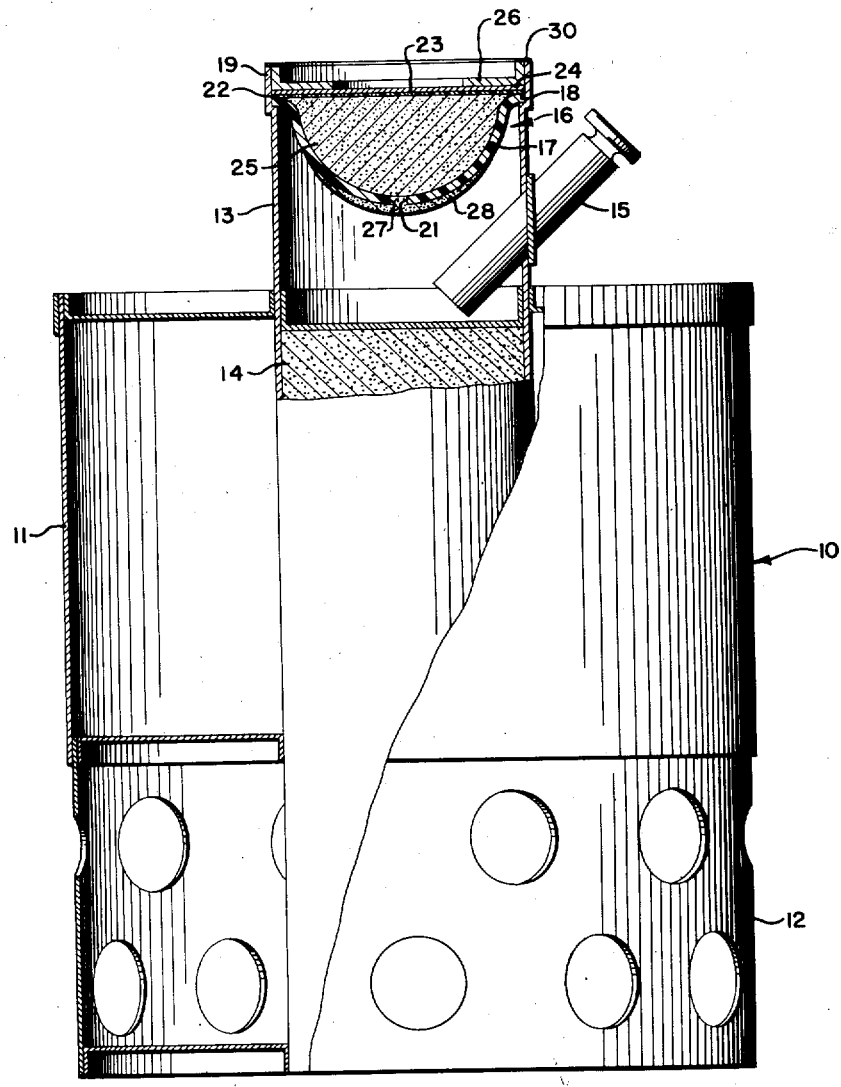
Fig. 1 is a sectional view of a signaling device illustrating the vent seal constructed in accordance with the present invention in sealing engagement with the device.

Referring now to the drawings wherein like reference numerals designate corresponding parts throughout the several views and more particularly to Fig. 1, the numeral 10 generally indicates a conventional signalling device. The signal device comprises a buoyant casing 11 having a stabilizer 12 carried thereby and a tubular member 13 disposed therein and secured thereto. Disposed within the tubular member 13 is a quantity of pyrotechnic material 14 adapted to be ignited by a conventional igniter 15 such, for example, as the type similar to the material disclosed in the patent application of L. D. Jackson, filed July 1, 1946, titled, Mechanical Igniter for Signaling Devices, now Patent No. 2,690,711.

A vent seal constructed in accordance with the present invention is disposed within and sealed in one end of tubular member 13, the sealing vent or capsule being generally indicated by the reference character 16 and comprising a cup-shaped element 17 of wall thickness from about 0.030 to 0.75 of an inch, composed of a plastic or resinous material, which will decompose by the flame and heat in the required time. Nitrocellulose, having from about 4% to 13% nitrogen is preferred material, but any plastic or resin may also be used in special cases, such as vinyl polymers and copolymers, acrylic resins, cellulose esters and ethers, alkyd resins, melamines, Bakelite, nylon, rubber, rubber hydrochloride, silicones and silicone rubbers. In making the cup-shaped element the plastics and resins may be combined with natural or synthetic fibres, such as cotton, rayon, nylon, silk, Dacron, Vinyon, or fillers such as wood dust, celite and the like. The element 17 is provided with a flange 18 in engagement with a complementary flange 19 formed on the tubular member 13 and having a centrally disposed opening 21 arranged therein. Disposed on the flange 18 is a plate 22 having a plurality of minute openings 23 therein and composed of any material suitable for the purpose such, for example, as nitrocellulose or plastic, the plate 22 being covered with a disc 24 of suitable metallic material. Pressed into the cup-shaped member 17 is an explosive charge 25. It will be understood that the wall of the cup-shaped member is of sufficient thickness to withstand the force of the explosion as the charge 25 is fired. The explosive or mixtures used in the cup-shaped member may be pressed therein to form a solid filling or the capsule may be filled with an appropriate explosive material in liquid or viscous form and allowed to harden or the explosives may be allowed to remain loose, if desired.

Figure 2:
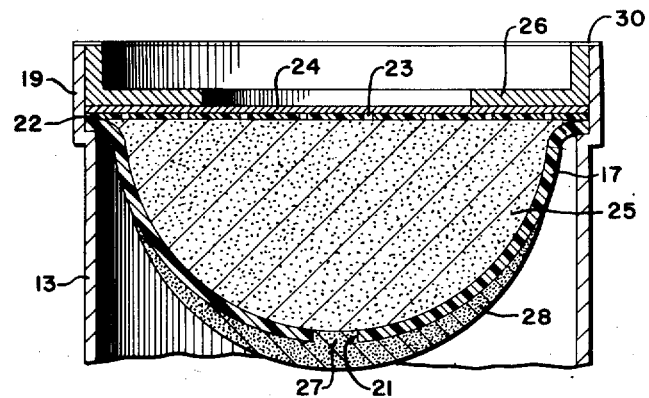
Fig. 2 is an enlarged fragmentary sectional view of the device of Fig. 1.

A ring 26 is pressed into tubular member 13 in sealing engagement therewith and with disc 24 whereupon the aforesaid explosive is sealed within the capsule 17 and the capsule is sealed within the container 13. If desired, however, the cup-shaped member 17, plate 23 and cover disc 24 may be bonded together with any material suitable for the purpose such, for example, as nitrocellulose or cement. The ring 26 and outer end of member 13 may be sealed as at 30 with a conventional type of cement. It will be noted that the opening 21 has an ignition composition 27 pressed therein and extending around the bottom 28 of the cup-shaped member as more clearly shown on Fig. 2. By the aforesaid arrangement it will be understood that upon ignition of the pyrotechnic material the flame and heat generated therefrom ignites the igniter composition 27. When this occurs the explosive charge 25 is fired and the force of the explosion forcibly ejects the ring 26, plate 22 and disc 24 from the container. As the pyrotechnic material within the signaling device burns, the cup-shaped member 17 is consumed by the heat and flame generated therefrom whereupon the member 17 is unsealed and the signaling device will function to emit smoke, flame, or to discharge a flare, as the case may be.

Figure 3:
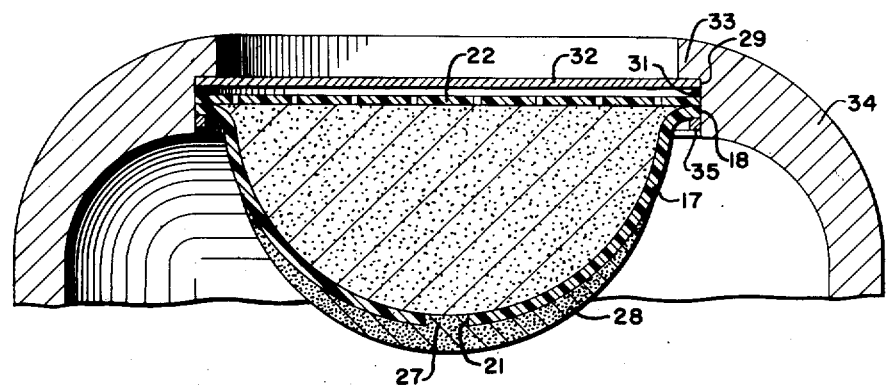
Fig. 3 is an enlarged fragmentary view of an alternative arrangement of the device of Fig. 1.

In the arrangement of Fig. 3, the seal 16 is disposed within an opening 29 formed in the signaling device and comprises a gasket 31, composed of any material suitable for the purpose, such, for example, as rubber or the like. The gasket is disposed between the plate 22 and a cover plate 32 composed of metal or plastic. It will be noted in this arrangement that the device is sealed within the opening 29 between a flange 33 formed on the casing 34 and a ring 35 pressed into the opening 29, the ring being pressed into the opening with sufficient force to cause the component parts of the seal to be forced into sealing engagement with respect to each other and with respect to the casing.

Figure 4:
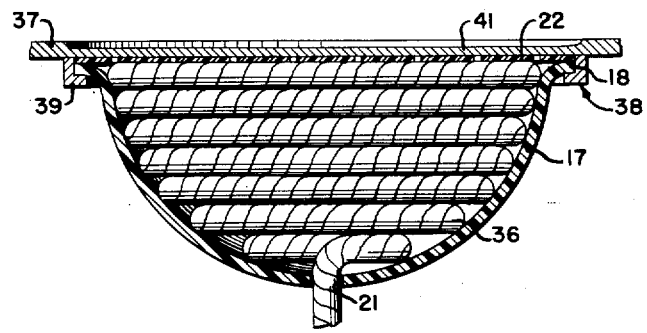
Fig. 4 is a view similar to Fig. 2 illustrating another arrangement of the device of Fig. 1.

Referring now to Fig. 4, the member 17 has arranged therein a conventional ignition fuze 36, either of the open type such, for example, as a black match, quick match, instantaneous fuze or of the closed type such as a miner's fuze. Moreover, if desired, a special small type detonating primer cord may be used in lieu of the explosive charge 25. The capsule is supported on the casing 37 of the signaling device by a member 38 having a flange 39 in engagement with flange 18 formed on the cup-shaped member, the capsule being in alignment with a weakened portion 41. By this arrangement it will be understood that when the fuze is ignited, the pressure generated therefrom will be sufficient to cause rupture of the weakened portion 41 whereupon the signaling device will omit a visible signal.

Figure 5:
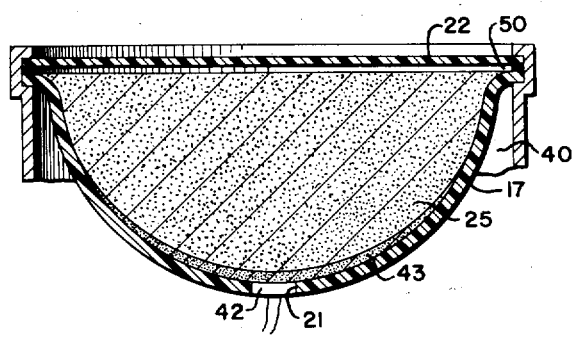
Figs. 5 and 6 are enlarged fragmentary views illustrating still other alternate forms of the device of Fig. 1.

In the arrangement of Fig. 5 the opening 21 in member 17 has sealed therein an electric squib 42 in operational engagement with an igniter or primer charge 43 disposed on the inner wall of the member 17 and adapted to fire the explosive charge 25 as the primer charge is fired by the squib in response to an electrical impulse received thereby. When this occurs the cover is forcibly ejected from the vent 40 and the cup-shaped member is consumed in the aforesaid manner thereby unsealing the vent. The disc 22 in this arrangement may be devoid of perforations, if desired, and a suitable sealing compound 50 may be used to seal the cover to the cup-shaped member. The seal of Fig. 5 may be attached to the signaling device in any suitable manner and, if desired the cup-shaped member 17 may be provided with a perforated reinforcing thimble or casing to additionally strengthen the member against the explosive force to which it is subjected as the charge 25 is fired.

Figure 6:
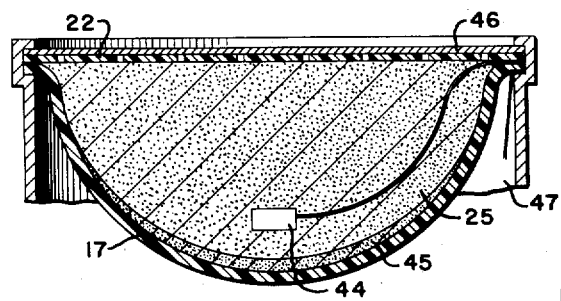

Referring to the device of Fig. 6 it will be noted that the charge 25 has a detonator 44 arranged therein and an igniter charge 45 is disposed on the inner wall of the member 17 and the disc 22 is covered by an external covering 46, composed of a thin plastic or metallic material. As the charge 25 is fired by the detonator or primer 44, the aforesaid disc and cover 46 are forcibly ejected from the cup-shaped member and concurrently therewith the igniter charge 45 is ignited and as the charge burns the member 17 is consumed by the heat and flame emitted therefrom thereby unsealing the vent 47.

The explosive material used within the capsule 17 may be of any suitable pyrotechnic or explosive mixture, such, for example as black powder, either small or large grain size. Various types of smokeless powder may be also used, such as ball grain powder, shot gun powder, rifle and small arms propellant, black meal powder or modified black meal powder, any composition consisting of powdered metals and oxidants, such as nitrates, perchlorates and the like, fuze compositions, double base powders, or nitro starches and nitrocelluloses in flaked or fiber form. The aforesaid types of powders are considered to be in the propellent class and, if desired, they may also be used in other forms, for example, various types of fuzes made with meal powder may be placed as a coil or in a ring or merely crowded into the capsule. Furthermore, wall thickness of the cup may be made to withstand stronger explosive force, and thus will permit the use of strong seals wherever desired. Thus other explosive materials which may be used within the capsule include such materials as diazodinitrophenol, tetracene, nitrosoguanidine, metallic picrates, metallic styphnates and basic styphnates and various metallic diazonitro compounds and composition containing moderate amounts of lead azide.

In the aforesaid vent seal structure the nitrocellulose or plastic cover 22 for the cup-shaped member 17 is considerably thinner than the wall of the cup-shaped member, the aforesaid elements being bonded together by a nitrocellulose or other suitable type cement. Moreover, the cover 22 may be a multi-perforated disc having holes therein generally of a smaller size than the grains, balls, or flakes of the powder within the capsule. The top or exterior or outer cover 24 may be of suitable metallic material such, for example, as tin plate, thin steel, soft alloys, lead, aluminum, magnesium and aluminum foil. Furthermore, the explosive material 25 in the cup-shaped member 17 may be dispensed with, if desired, and in lieu thereof the cover plate 22 may be coated with a suitable prime of an explosive material or mixture, the explosive coating being ignited in any suitable manner such, for example as by a fuze, electric squib, the igniter means of the pyrotechnic signaling device or by the heat and flame from the pyrotechnic material contained in the device as the material is ignited and burns thereby to unseal the device and emit smoke, flame or to discharge a flare, as the case may be.

From the foregoing, it will be apparent that new and improved vent seal for munition devices has been devised having the desired characteristics of resistance to mechnical shock and vibrations, resistance to adverse effects caused by wide temperature variations and which is consumed in a short period of time by heat and flame thereby to vent the device and prevent disruption thereof by the accumulation of gas pressure generated therein as the pyrotechnic material is ignited and burns.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An element for sealing a vent in a pyrotechnic charged ordnance device comprising a capsule disposed within said vent and composed of a material consumable by heat and flame, cover means in sealing engagement with said capsule and with the device for sealing said vent, and an explosive charge disposed within said capsule for forcibly ejecting said cover from the capsule and said device as the charge is fired, said capsule having a wall of sufficient thickness to withstand the force of the explosion as said explosive charge is fired and consumed sufficiently by said heat and flame to unseal said vent as the pyrotechnic charge is ignited and burns.

2. A claim according to claim 1 and including an electric squib sealed in the bottom of said cup-shaped member.

3. An element for sealing a vent in a pyrotechnic charged ordnance device comprising a capsule having an opening therein disposed within said vent and composed of a material consumable by heat and flame, cover means for said capsule in sealing engagement with the capsule and said device, and an explosive charge disposed within said capsule for forcibly ejecting said cover means for the capsule and device as the explosive charge is fired, means carried by said capsule for firing said charge, said capsule having a wall of sufficient thickness to withstand the force of the explosion as said charge is fired and to be consumed sufficiently by said heat and flame to unseal said vent.

4. A claim according to claim 3 wherein said explosive charge consists of granular black powder, and wherein said opening is filled with black meal powder nitrocellulose primed and extending contiguously on one surface of said cup-shaped member.

5. A claim according to claim 3 and including an ignition fuse extending through said opening and coiled within said cup-shaped member.

6. An element for sealing a vent in a pyrotechnic charged ordnance device comprising a capsule sealed within said vent and composed of a material consumable by heat and flame, sealing means for said capsule, a cover bonded to said capsule in sealing engagement with said device, explosive means disposed within said capsule for forcibly ejecting said cover from the capsule and said device as the charge is fired, means carried by said capsule for firing said explosive means, a wall on said capsule of sufficient strength to withstand the force of the explosion as said explosive means is fired, and means ignited by said explosive means for producing a sufficient amount of heat and flame to consume said capsule and thereby unseal the vent.

7. A vent seal of the character disclosed comprising a capsule having a disc bonded to said capsule, said disc and capsule being composed of nitrocellulose, an explosive charge disposed within said capsule, means carried by said capsule for igniting said explosive charge, and a wall on said capsule of sufficient strength to withstand the force of the explosion as the charge is fired.

8. A claim according to claim 7 and including a thin metallic cover on said nitrocellulose disc.

References Cited in the file of this patent
UNITED STATES PATENTS

| | | |
|---|---|---|
| 2,032,357 | Fischer et al. | Mar. 3, 1936 |
| 2,119,697 | Anderson | June 7, 1938 |